United States Patent
Jahnz et al.

(10) Patent No.: US 9,941,766 B2
(45) Date of Patent: Apr. 10, 2018

(54) PENETRATOR POWER CONNECTOR FOR AN INTEGRATED ROTARY MACHINE

(71) Applicant: Solar Turbines Incorporated, San Diego, CA (US)

(72) Inventors: David B. Jahnz, San Diego, CA (US); Jason Wing-Bin Fong, San Diego, CA (US); Lei Zhu, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 548 days.

(21) Appl. No.: 14/468,152

(22) Filed: Aug. 25, 2014

(65) Prior Publication Data

US 2015/0285253 A1    Oct. 8, 2015

Related U.S. Application Data

(60) Provisional application No. 61/975,412, filed on Apr. 4, 2014.

(51) Int. Cl.
| | |
|---|---|
| *F04D 13/06* | (2006.01) |
| *H02K 5/22* | (2006.01) |
| *F04D 17/12* | (2006.01) |
| *F04D 25/06* | (2006.01) |
| *H01R 13/533* | (2006.01) |
| *H02K 5/12* | (2006.01) |

(52) U.S. Cl.
CPC .......... *H02K 5/225* (2013.01); *F04D 17/122* (2013.01); *F04D 25/0606* (2013.01); *H01R 13/533* (2013.01); *H02K 5/12* (2013.01)

(58) Field of Classification Search
CPC . H02K 5/225; H02K 5/12; H02K 3/50; F04D 17/122; F04D 25/0606; H01R 13/533; H01R 13/5202
USPC ............................................ 417/422; 310/71
See application file for complete search history.

(56) References Cited

U.S. PATENT DOCUMENTS

| | | | |
|---|---|---|---|
| 4,583,794 A | 4/1986 | Takahara et al. | |
| 5,627,420 A * | 5/1997 | Rinker .................. | F04D 29/628 310/54 |
| 6,300,698 B1 | 10/2001 | Fargo et al. | |
| 6,779,989 B2 | 8/2004 | Makino et al. | |
| 7,763,808 B2 | 7/2010 | Tolbert, Jr. | |
| 7,932,655 B2 | 4/2011 | Buhler et al. | |
| 2003/0075319 A1* | 4/2003 | Chau ....................... | E21B 7/046 166/65.1 |
| 2005/0054234 A1 | 3/2005 | Daniel et al. | |
| 2007/0175201 A1 | 8/2007 | Callas et al. | |

(Continued)

*Primary Examiner* — Essama Omgba
*Assistant Examiner* — Stephen Mick
(74) *Attorney, Agent, or Firm* — Procopio, Cory, Hargreaves & Savitch LLP

(57) ABSTRACT

A power connector for an electric motor is disclosed. The power connector includes a flange, a conductor rod, and an insulation sleeve. The conductor rod includes a first portion extending in a first direction from the flange and a second portion extending from the flange in a second direction, opposite the first direction. The second portion includes a lead wire connection end distal to the flange. The insulation sleeve covers the second portion from the flange to the lead wire connection end. The insulation sleeve includes a sleeve outer surface, and a sealing rib extending outward from the sleeve outer surface.

19 Claims, 5 Drawing Sheets

(56) References Cited

U.S. PATENT DOCUMENTS

2011/0136364 A1   6/2011  Montrade
2013/0183853 A1*  7/2013  Sivik ..................... H02G 3/22
                                                  439/519

* cited by examiner

PENETRATOR POWER CONNECTOR FOR AN INTEGRATED ROTARY MACHINE

CROSS-REFERENCE TO RELATED APPLICATIONS

The application claims the benefit of U.S. provisional patent application Ser. No. 61/975,412, filed Apr. 4, 2014, which is hereby incorporated by reference.

TECHNICAL FIELD

The present disclosure generally pertains to integrated rotary machines, and toward a gas compressor with an integrated electric motor.

BACKGROUND

Electric motors convert electrical energy to mechanical energy to drive rotary machines, such as centrifugal gas compressors. The electric motor and the rotary machine can be assembled into a single housing. This integrated system may be more compact than a separate electric motor and rotary machine system.

U.S. Pat. No. 6,300,698 issued to Lyons et al. on Oct. 9, 2001 discloses a hermetic compressor and electrical connector. A shell of the compressor defines an internal chamber and a motor positioned inside the shell within the chamber drives the compressor. The motor has a stator assembly including a winding. A hermetic terminal plug connects the winding to a power supply to energize the motor. The plug has an internal conductor pin electrically connected to a corresponding external conductor pin. The internal conductor pin protrudes into the internal chamber for connection to the winding and the external conductor pin extends away from the shell for connection to the power supply for energizing the motor. The compressor also includes a terminal block mounted on the stator assembly for supporting an end portion of the winding. The terminal block has a notch aligned with the internal conductor pin for receiving the internal conductor pin when the motor is positioned inside the shell. In this manner, the internal conductor pin is electrically connected to the end portion of the winding supported by the terminal block.

The present disclosure is directed toward overcoming one or more problems discovered by the inventors or that is known in the art.

SUMMARY OF THE DISCLOSURE

A power connector for an electric motor is disclosed. The power connector includes a flange, a conductor rod, and an insulation sleeve. The conductor rod is formed from a conducting material and includes a first portion and a second portion. The first portion extends in a first direction from the flange and the second portion extends from the flange in a second direction, opposite the first direction. The second portion includes a lead wire connection end distal to the flange, and a lead wire connection feature at the lead wire connection end. The insulation sleeve covers the second portion from the flange to the lead wire connection end. The insulation sleeve includes a sleeve outer surface, and a sealing rib extending outward from the sleeve outer surface.

DETAILED DESCRIPTION

The systems and methods disclosed herein include an integrated machine including an electric motor and a rotary machine within a common housing. In embodiments, the electric motor and its components are located within a motor can fixed within the housing. One or more power connectors includes a conductor rod including a first portion configured to connect to a power source and a second portion configured to extend through the housing and the motor can and connect to a motor lead wire. An insulation sleeve is configured to cover the second portion and includes one or more sealing ribs. The sealing ribs locate within a can connector hole, contacting the surface within the can connector hole. The contact between the inner ribs and the inner surface may form a seal and may support a lead wire connection end of the second portion, which may reduce vibration of the conductor rod.

Figure 1:
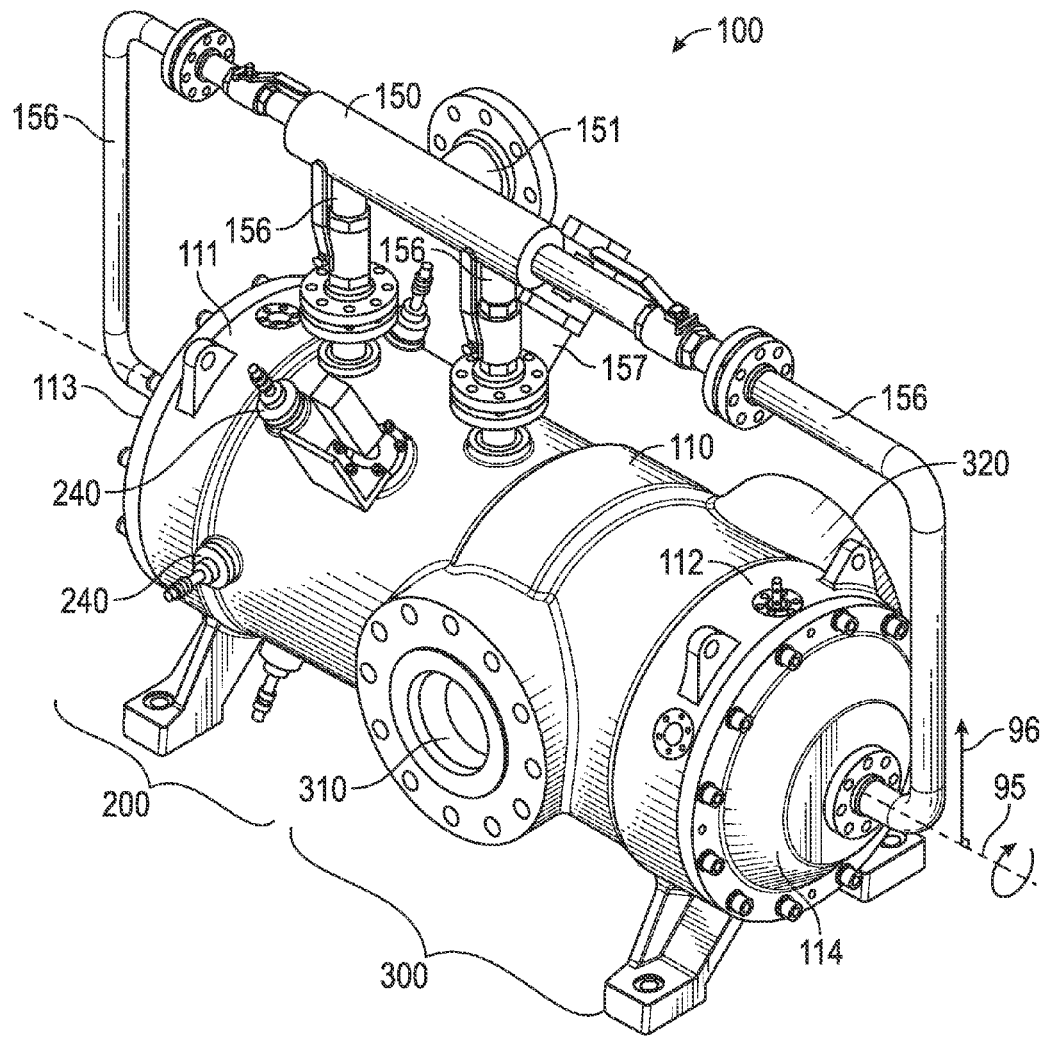
FIG. 1 is a perspective view of an exemplary gas compressor integrated machine.

FIG. 1 is a perspective view of an exemplary integrated machine 100. In the example depicted, the integrated machine 100 is a gas compressor. Some of the surfaces may have been left out or exaggerated (here and in other figures) for clarity and ease of explanation. Also, the disclosure may reference a forward and an aft direction. Generally, all references to "forward" and "aft" are associated with a flow direction of a gas within the integrated machine 100. In the embodiment illustrated, the first end 111 is the forward end and the second end 112 is the aft end.

Figure 2:
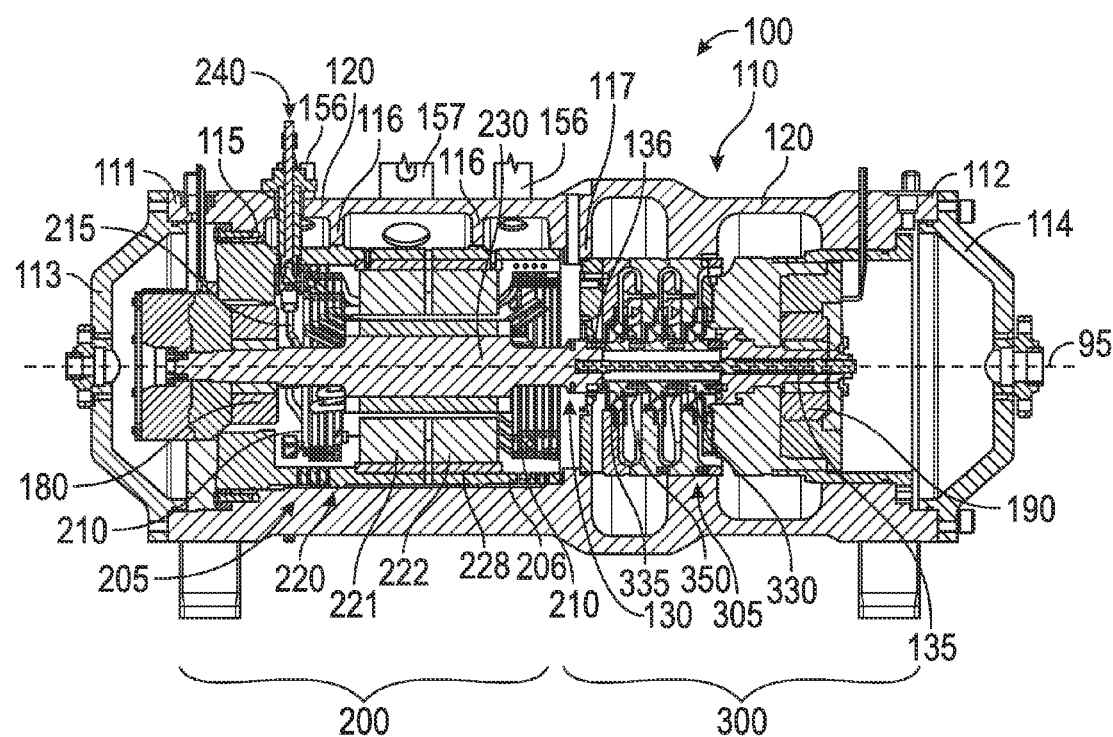
FIG. 2 is a cross-sectional view of the integrated machine of FIG. 1.

In addition, the disclosure may generally reference a center axis 95 of rotation of the rotary machine, which may be generally defined by the longitudinal axis of the rotor assembly 130 of the integrated machine (shown in FIG. 2). The center axis 95 may be common to or shared with various other concentric components of the integrated machine 100. All references to radial, axial, and circumferential directions and measures refer to center axis 95, unless specified otherwise, and terms such as "inner" and "outer" generally indicate a lesser or greater radial distance from the center axis 95, wherein a radial 96 may be in any direction perpendicular and radiating outward from center axis 95.

The integrated machine 100 includes a housing 110, a motor section 200, and a rotary machine section 300. The housing 110 may include an outer shell 120 with a first end 111 and a second end 112, and multiple internal ridges. In the embodiment illustrated, the motor section 200 is adjacent the first end 111 and the rotary machine section 300 is adjacent the second end 112. The motor section 200 includes one or more power connectors 240 extending through the housing 110 to supply power to a motor assembly 205 (shown in FIG. 2). The rotary machine section 300 includes a rotary machine 305 (shown in FIG. 2). In the embodiment illustrated, the rotary machine 305 is a centrifugal gas compressor. As illustrated, the rotary machine section 300 includes a suction port 310 adjacent the motor section 200 and a discharge port 320 adjacent the second end 112, aft of the suction port 310. In other embodiments, the flow may be in the opposite direction with the suction port 310 being adjacent the second end 112 and the discharge port 320 being adjacent the motor section 200. The integrated machine 100 may also include a first end cap 113 connected to the first end 111 of the housing 110 and a second end cap 114 connected to the second end 112 of the housing 110.

The integrated machine 100 may include coolant supply lines 150 for supplying a coolant, such as air to the integrated machine 100. The coolant supply lines 150 include a supply connection 151 that is configured to connect to a coolant supply. In the embodiment shown, coolant inlet lines 156 connect to each end cap of the integrated machine 100 and two coolant inlet lines 156 connect to the housing 110 at the motor section 200. In the embodiment illustrated, a coolant outlet line 157 also connects to the housing 110 at the motor section 200. The coolant supply lines 150 may include various flanges, fittings, and valves for connecting to the coolant supply and for controlling the flow of the coolant.

FIG. 2 is a cross-sectional view of the integrated machine 100 of FIG. 1. The rotor assembly 130 may include a driver shaft 230 located within the motor section 200 joined to a machine rotor 330 located within the rotary machine section 300. The driver shaft 230 may include shaft laminations 232. Shaft laminations 232 may be located on a radially outer portion of the driver shaft 230. In the embodiment illustrated, driver shaft 230 and machine rotor 330 are joined by a tierod 135 and may not need a coupling. Driver shaft 230 and machine rotor 330 may also be joined/bolted together by bolts 136, or by other coupling means. The rotor assembly 130 is supported by a first bearing 180 and a second bearing 190. The first bearing 180 is located within the motor section 200 proximal the first end 111 and is configured to support the end of the driver shaft 230 adjacent the first end 111. The second bearing 190 is located within the rotary machine section 300 proximal the second end 112 and is configured to support the end of the machine rotor 330 adjacent the second end 112. The first bearing 180 and the second bearing 190 are radial bearings. The integrated machine 100 may also include a third radial bearing located between the first bearing 180 and the second bearing 190. The integrated machine 100 may further include a thrust bearing. In the embodiment illustrated, the bearings, including the first bearing 180 and the second bearing 190, are magnetic bearings. Other bearings, such as radial contact bearings, may also be used.

Figure 3:
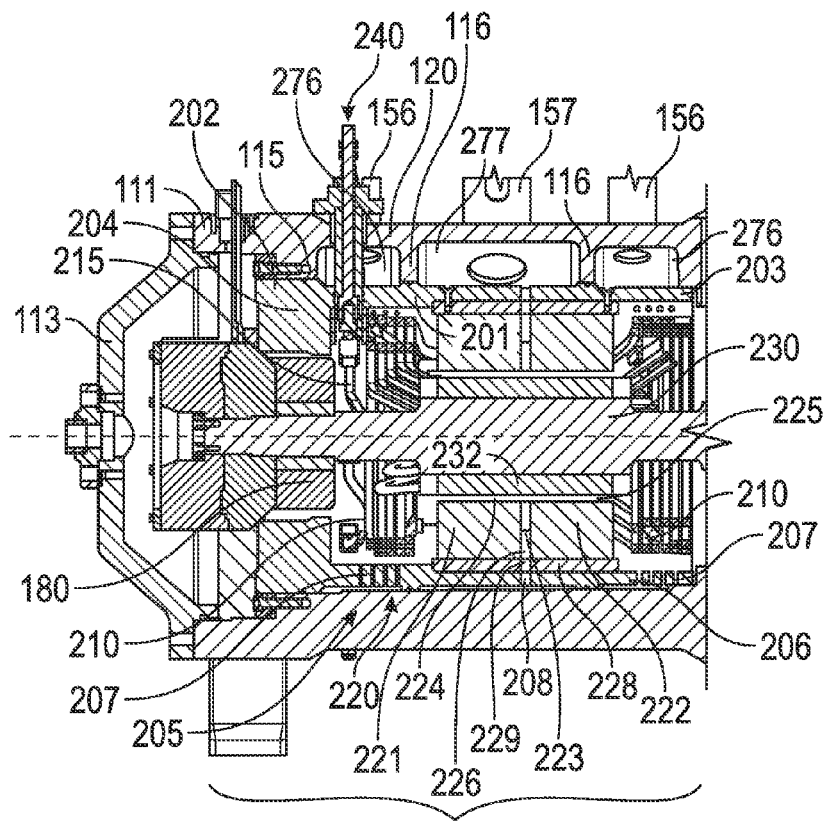
FIG. 3 is a detailed view of the cross-section of FIG. 2 at the motor section.

FIG. 3 is a detailed view of the cross-section of FIG. 2 at the motor section 200. Referring to FIGS. 2 and 3, the motor section 200 includes a motor assembly 205, coolant inlet passages 276, and coolant outlet passages 277. The motor assembly 205 may be proximal the first end 111. The motor assembly 205 includes a motor can 205, end windings 210, a lamination sleeve 228, stator laminations 220, and the one or more power connectors 240. Some of the motor assembly components, such as the end windings 210 and the stator laminations 220 may be assembled within the motor can 205.

The housing 110 may be configured to receive the motor can 206. The housing 110 at the motor section 200 may include a first end ridge 115, middle ridges 116, and section ridge 117 extending radially inward that are configured to support the motor can 206. The coolant inlet passages 276 may be located radially outward from each end of the motor can 206 and may be radial passages configured to taper radially from the location of the coolant inlet lines 156 to the opposite circumferential side of the housing 110. One of the coolant inlet passages 276 may be formed by the first end ridge 115, a middle ridge 116, outer shell 120, and motor can 206. The other coolant inlet passage 276 may be formed by a middle ridge 116, section ridge 117, outer shell 120, and motor can 206.

The coolant outlet passage 277 may be located radially outward from motor can 206 and between the coolant inlet passages 276, and may be formed by the middle ridges 116, the outer shell 120 and the motor can 206. The coolant outlet passage 277 may also be configured to taper radially from the location of the coolant outlet line 157 to the opposite circumferential side of the housing 110.

The motor can 206 may include a body 201, an annular plate 204, motor cooling inlets 207, and a motor cooling outlet 208. The body 201 includes a hollow cylinder shape with a body first end 202 and a body second end 203, distal to the body first end 202. The body first end 202 may be located proximal first end 111 and first end cap 113. The body second end 203 may be the end of body 201 distal to first end 111 and first end cap 113. The annular plate 204 may be located at the body first end 202 and may extend radially inward from body 201. The bore defined by the annular shape of annular plate 204 may be sized and configured to receive all or a portion of first bearing 180.

Motor cooling inlets 207 may extend through body 201 adjacent each end of body 201 and may be configured to supply coolant from a coolant inlet passage 276 to end windings 210 and stator laminations 220. Motor cooling inlets 207 may include multiple circumferential rows of radial holes adjacent each end of body 201. Motor cooling outlets 208 may extend through body 201 and may be a row of holes located between the sets of motor cooling inlets 207 adjacent each end of body 201.

End windings 210 may be located within the motor can 206 at each end of body 201. Lamination sleeve 228 may be located within motor can 206 and between end windings 210. Lamination sleeve 228 may be radially inward from motor can 206 and contiguous to motor can 206. Lamination sleeve 228 may also be fixed to motor can 206. Lamination sleeve 228 may be a hollow cylinder shape. Lamination sleeve 228 may include lamination sleeve cooling outlets 229 extending through the hollow cylinder shape of lamination sleeve 228. Lamination sleeve cooling outlets 229 align with motor cooling outlet 208.

Stator laminations 220 may be located between the end windings 210 at each end of body 201 within lamination sleeve 228. Stator laminations 220 may be attached to lamination sleeve 228. In the embodiment illustrated, stator laminations 220 include a first lamination section 221 and a second lamination section 222 axially spaced apart with an air gap cooling outlet 226 located there between. Air gap cooling outlet 226 is aligned with lamination sleeve cooling outlets 229. Motor windings 223 extend between end windings 210, through stator laminations 220. Motor windings 223 may be arranged in groups with a cover around each group when extending between first lamination section 221 and second lamination section 222. The groups may be in a circumferential pattern.

First lamination section 221 may be radially spaced apart from driver shaft 230 forming a first air gap there between and second lamination section 222 may be radially spaced apart from driver shaft 230 forming a second air gap 225 there between.

Figure 4:
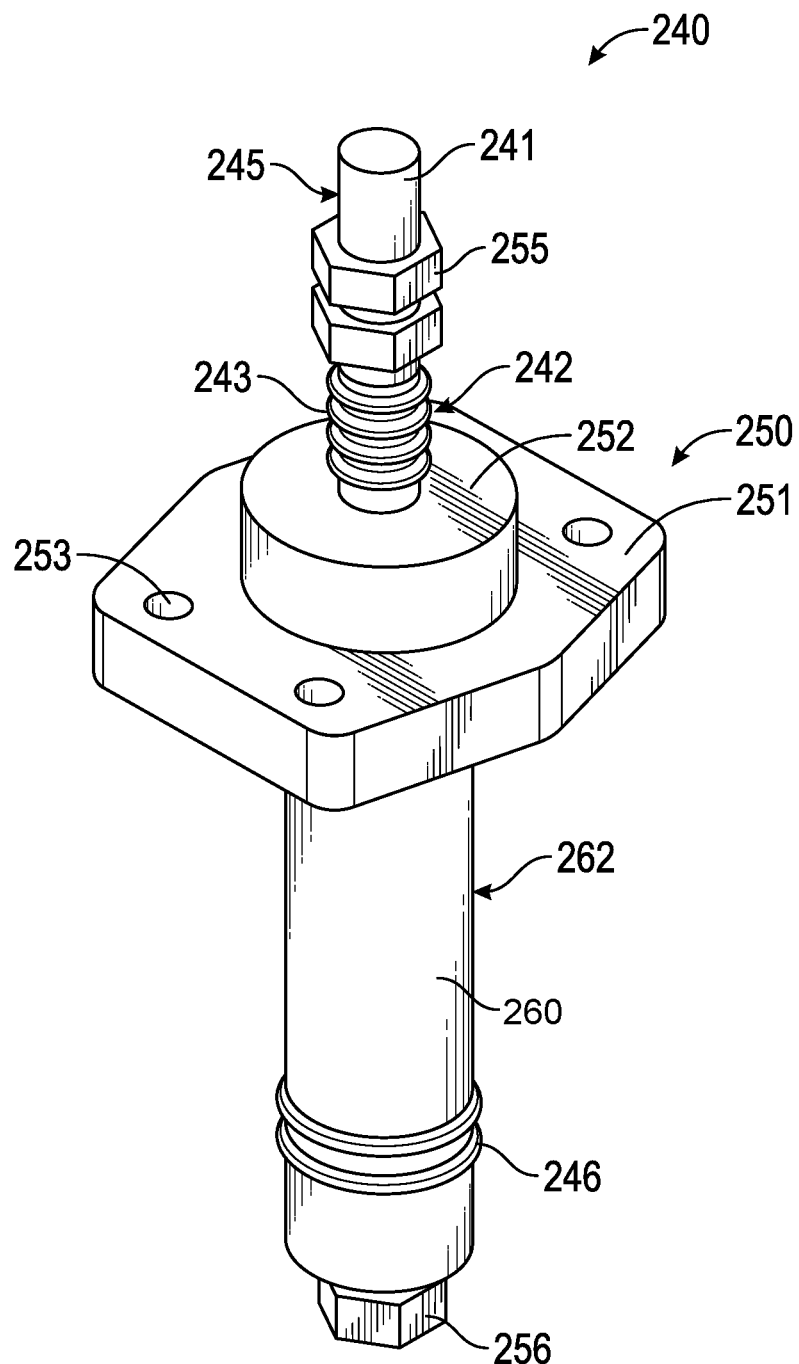
FIG. 4 is a perspective view of a power connector of the integrated machine of FIGS. 1 and 2.
Figure 5:
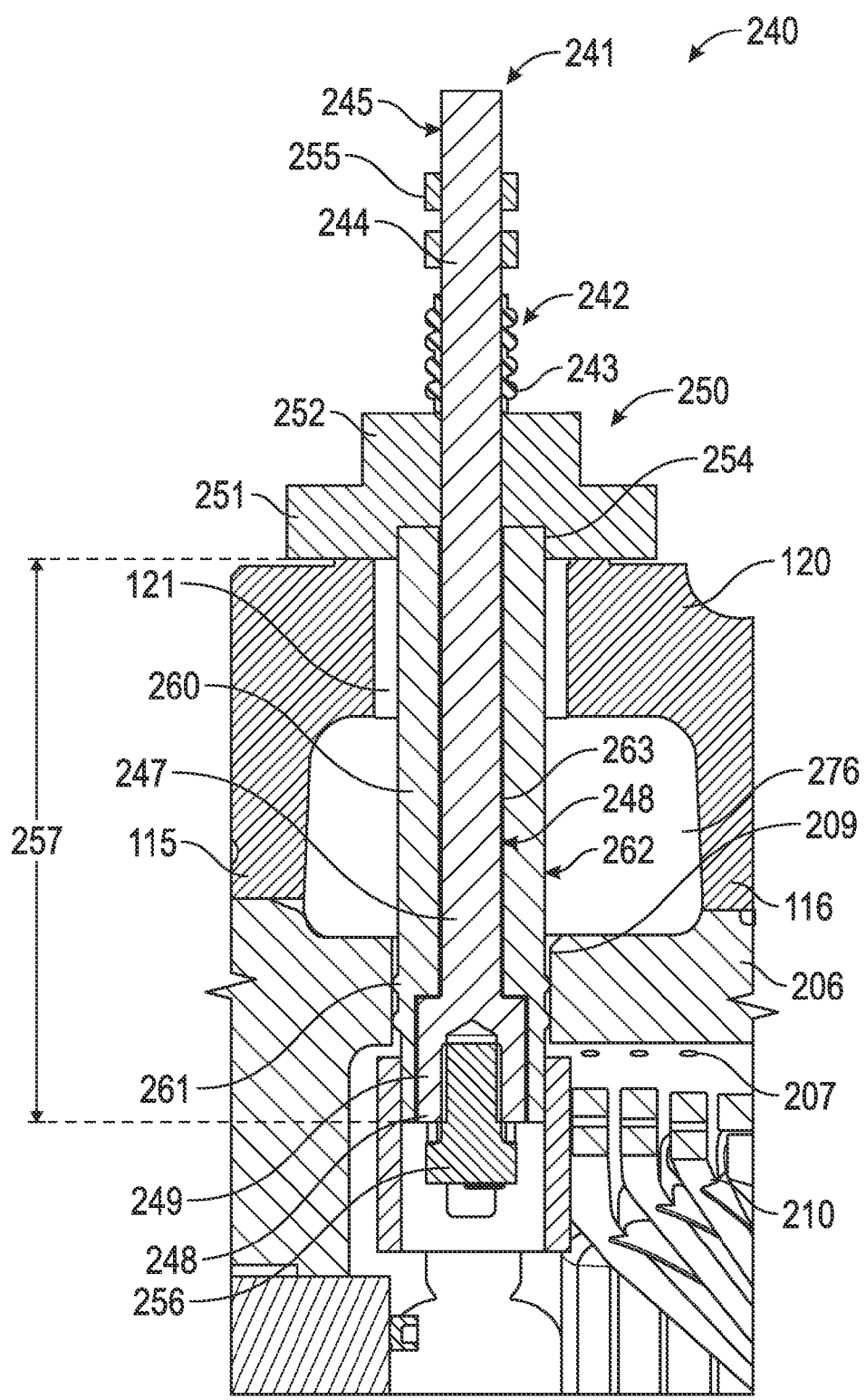
FIG. 5 is a detailed view of the cross-section of FIG. 2 at the power connector.

FIG. 4 is a perspective view of a power connector 240 of the integrated machine 100 of FIGS. 1-3. FIG. 5 is a detailed view of the cross-section of FIG. 2 a power connector 240. Referring to FIGS. 3 and 4, power connectors 240 may include a flange 250, a conductor rod 241, a first seal 242, an insulation sleeve 260, a source connector 255, and a lead wire connector 256. Flange 250 is configured to secure power connector 240 to housing 110. Flange 250 may include a flange portion 251 with bolt holes 253. Flange portion 251 includes a housing mating surface 259 that contacts housing 110 when power connector 240 is secured to housing 110. Flange 250 may also include a boss portion 252 extending from flange portion 251 in a first direction. Boss portion 252 may extend from the surface of flange portion 251 opposite housing mating surface 259 and may extend away from housing 110.

Conductor rod 241 extends through flange 250. Conductor rod 241 includes a conducting material, such as a copper. In the embodiment illustrated, conductor rod 241 is a right cylindrical rod. In other embodiments, conductor rod 241 is a right prism. Conductor rod 241 includes a first portion 244 and a second portion 247. First portion 244 extends from flange 250 in the first direction, outward from housing 110. Second portion 247 extends from flange 250, and more particularly from housing mating surface 259 in a second direction, opposite the first direction and inward relative to housing 110. Second portion 247 may extend inward and may be configured to extend through a housing connector hole 121, a coolant inlet passage 276, and a can connector hole 209 and into motor can 206. The housing connector hole 121 extending through housing 110 and the can connector hole 209 extending through body 201 of motor can 206, adjacent annular plate 204.

First portion 244 includes a first portion outer surface 245, and second portion 247 includes a second portion outer surface 246. First portion outer surface 245 and second portion outer surface 246 may be cylindrical surfaces for a cylindrical conductor rod 241 or the sides of a prism for a prism shaped conductor rod 241.

The end of first portion 244 distal to flange 250 may be threaded. A source connector 255 may connect a power source to the power connector 240. Source connector 255 couples with the first portion 244. In the embodiment illustrated, source connector is a pair of nuts sized to mate with the threaded end of first portion 244. Second portion 247 may include a lead wire connection end 248 distal to flange 250. Second portion 247 may also include a lead wire connection feature 249 at lead wire connection end 248 for mating with a lead wire connector 256 to connect a lead wire 215 to the power connector 240. In the embodiment illustrated, lead wire connection feature 249 is a socket and lead wire connector 256 is a bolt sized to mate with the socket. In other embodiments, lead wire connection feature 249 is a threaded portion of second portion 247 at lead wire connection end 248 and lead wire connector 256 is a pair of nuts sized to mate with the threaded portion of second portion 247.

Second portion 247 may be longer than first portion 244. Second portion 247 extends from housing mating surface 259 to lead wire connection end 248 at a second portion length 257. In one embodiment, second portion length 257 is at least 15.24 centimeters (6.0 inches). In another embodiment, second portion length 257 is from 15.24 centimeters (6.0 inches) to 17.78 centimeters (7.0 inches). In yet another embodiment, second portion length 257 is from 16.00 centimeters (6.3 inches) to 17.02 centimeters (6.7 inches). In still another embodiment, second portion length 257 is 16.51 centimeters (6.5 inches).

First seal 242 is contiguous to flange 250, covering a part of the first portion 244 adjacent flange 250. In embodiments including boss portion 252, first seal 242 is contiguous to boss portion 252. First seal 242 may include one or more ribs 243. First seal 242 may be formed of a material that acts as a sealant and/or an insulator, such as epoxy, nylon, etc.

Insulation sleeve 260 may also be contiguous to flange 250. Insulation sleeve 260 may cover second portion outer surface 246 for the entire second portion length 257 and may extend from flange 250 to lead wire connection end 248. Insulation sleeve 260 includes an inner cavity 263 extending there through. Inner cavity 263 is shaped and sized to match the shape and size of second portion 247.

Insulation sleeve 260 may be an elongated shape, such as a right cylinder or a right prism, and is sized to fit through a housing connector hole 121 and a can connector hole 209. Insulation sleeve 260 includes a sleeve outer surface 262. Sleeve outer surface 262 may be a cylindrical surface for a cylindrical insulation sleeve 260 or may be the sides of a prism for a prism shaped insulation sleeve 260. Insulation sleeve 260 may be formed of a material that acts as a sealant and/or an insulator, such as epoxy, nylon, etc.

Insulation sleeve 260 may also include sealing ribs 261. Sealing ribs 261 extend outward from sleeve outer surface 262 relative to the conductor rod 241. Sealing ribs 261 are configured to form a seal with a can connector hole 209, such as with an interference fit. As illustrated in FIG. 4, sealing ribs 261 may be located within a can connector hole 209 and radially aligned with body 201 of motor can 205 when assembled to the integrated machine 100.

In the embodiment illustrated, insulation sleeve 260 includes two sealing ribs 261. Insulation sleeve 260 may include more or less sealing ribs 261, such as one, three, or more. Each sealing rib 261 may include an annular shape and may include an outside diameter larger than the diameter of can connector hole 209.

Flange 250 may include an annular slot 254 extending into flange portion 251 from the housing mating surface 259, and about the conductor rod 241. An end of insulation sleeve 260 may be located within annular slot 254 Insulation sleeve 260 may extend from flange 250, from within annular slot 254, to lead wire connection end 248.

Figure 6:
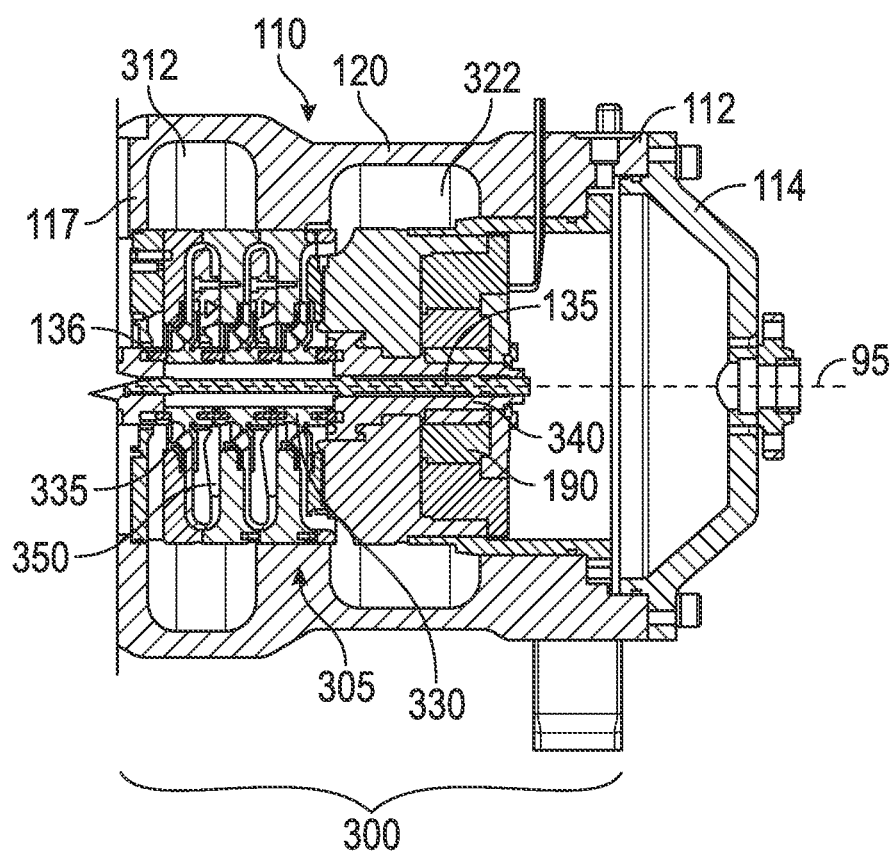
FIG. 6 is a detailed view of the cross-section of FIG. 2 at the rotary machine section.

FIG. 6 is a detailed view of the cross-section of FIG. 2 at the rotary machine section 300. Referring to FIGS. 2 and 6, rotary machine 305 may be proximal the second end 112. As illustrated, rotary machine 305 is a centrifugal gas compressor including an inlet passage 312, the machine rotor 330 that includes one or more centrifugal impellers 335, diffusers 350, and an outlet passage 322. The inlet passage 312 directs a process gas into the centrifugal gas compressor from the suction port 310 where the process gas is compressed. The process gas is then compressed by accelerating the process gas with centrifugal impellers 335 and converting the kinetic energy of the process gas to pressure in a diffuser 350 located downstream of each centrifugal impeller 335.

A centrifugal impeller 335 and its associated diffuser 350 may be considered a stage of the centrifugal gas compressor. In the embodiment illustrated, the centrifugal gas compressor includes 3 stages. After the process gas exits the diffuser 350 of the last stage, the outlet passage 322 directs the process gas to the discharge port 320. In embodiments, the machine rotor 330 includes the centrifugal impellers 335 and a stubshaft 340 connected to the centrifugal impellers 335.

INDUSTRIAL APPLICABILITY

Rotary machines, such as centrifugal gas compressors, may be used in industry to accomplish various tasks, such as to move process gas from one location to another. For example, centrifugal gas compressors are often used in the oil and gas industries to move natural gas in a processing plant or in a pipeline. These rotary machines may be driven by electric motors for various reasons, such as when it is desirable to reduce onsite emissions.

Rotary machines may be provided with an electric motor in a single package as an integrated machine with the electric motor and the rotary machine within the same housing. Such an integrated machine may reduce the size of the overall package and may reduce the number of parts required for the package, resulting in cost and space savings.

Power connectors 240 for electric motors within a larger package, such as the integrated machine 100 disclosed herein, may be configured to extend at least 15.24 centimeters (6.0 inches) so that lead wire connection end 248 is located within motor can 206 when power connectors 240 are assembled to the motor assembly 205.

Insulation sleeve 260 may extend from flange 250 to lead wire connection end 248 to completely cover the second portion 247/electrode within the housing 110 up to the lead wire connection end 248. The sealing ribs 261 extending from insulation sleeve 260 may contact the motor can 206 within the can connector hole 209. This contact me form a seal between insulation sleeve 260 and motor can 206, which may prevent a fluid, such as a coolant, from passing through can connector hole 209. This contact may also support lead wire connection end 248 and prevent/reduce the vibration of second portion 247 within the motor assembly 205.

The preceding detailed description is merely exemplary in nature and is not intended to limit the invention or the application and uses of the invention. The described embodiments are not limited to use in conjunction with a particular type of machine. Hence, although the present embodiments are, for convenience of explanation, depicted and described as being implemented in an integrated machine, it will be appreciated that the power connectors can be implemented in various other types of electric motors, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. An electric motor for a rotary machine, the electric motor comprising:
    a housing;
    a motor can located within the housing, the motor can defining a can connector hole extending therethrough;
    a driver shaft extending within the motor can;
    end windings within the motor can located at each end of the motor can about the driver shaft;
    stator laminations located between the end windings, outward from the driver shaft, and within the motor can;
    a lead wire connected to the end windings; and
    a power connector including
        a flange including a first flange surface facing a first direction and a housing mating surface facing a second direction, the housing mating surface being contiguous with the housing, the first direction being opposite the second direction, and a third flange surface facing the second direction, the third flange surface defining an annular slot extending into the flange from the housing mating surface toward the first direction, the third flange surface being disposed between the first flange surface and the second flange surface along the second direction,
        a conductor rod formed from a conducting material, the conductor rod including
            a first portion extending in the first direction from the flange, and
            a second portion extending from the housing mating surface through the housing and through the motor can in the second direction, to a length of at least 15.24 centimeters, the second portion including a lead wire connection end distal to the flange, and a lead wire connection feature at the lead wire connection end,
        an insulation sleeve covering the second portion from the flange to the lead wire connection end, the insulation sleeve including
            a sleeve outer surface,
            a sealing rib extending outward from the sleeve outer surface and located within the can connector hole, the sealing rib being disposed between the housing mating surface of the flange and the lead wire connection end of the conductor rod along the second direction, the sealing rib forming a seal between the insulation sleeve and the motor can,
            a first sleeve end facing the first direction and a second sleeve end disposed opposite the first sleeve end, an entirety of the insulation sleeve being disposed between the first sleeve end and the second sleeve end along the second direction, and wherein the first sleeve end bears on the third flange surface, and
        a lead wire connector coupled to the lead wire connection feature coupling the lead wire to the power connector.

2. The electric motor of claim 1, wherein a length of the second portion is from 15.24 centimeters to 17.78 centimeters.

3. The electric motor of claim 1, wherein the lead wire connection feature is a socket and the lead wire connector is a bolt.

4. The electric motor of claim 1, wherein the conductor rod is formed from a metal, and the insulation sleeve includes nylon.

5. The electric motor of claim 1, further comprising a first seal contiguous with the flange and covering a part of the first portion adjacent the flange, the first seal including one or more ribs.

6. A power connector for an electric motor, the power connector comprising:
    a flange having a first flange surface facing a first direction, a second flange surface comprising a housing mating surface facing a second direction, the first direction being opposite the second direction, and a third flange surface facing the second direction, the third flange surface defining an annular slot extending into the flange from the housing mating surface toward the first direction, the third flange surface being disposed between the first flange surface and the second flange surface along the second direction;
    a conductor rod formed from a conducting material, the conductor rod including
        a first portion extending in the first direction from the flange; and
        a second portion extending from the flange in the second direction, the second portion including
            a lead wire connection end distal to the flange, and
            a lead wire connection feature at the lead wire connection end; and an insulation sleeve covering the second portion from the flange to the lead wire connection end, the insulation sleeve including
a sleeve outer surface,
a sealing rib extending outward from the sleeve outer surface, the sealing rib being disposed between the second flange surface and the lead wire connection end of the conductor rod along the second direction, and
a first sleeve end facing the first direction and a second sleeve end disposed opposite the first sleeve end, an entirety of the insulation sleeve being disposed between the first sleeve end and the second sleeve end along the second direction, and wherein the first sleeve end bears on the third flange surface.

7. The power connector of claim 6, wherein a length of the second portion is at least 15.24 centimeters.

8. The power connector of claim 6, wherein a length of the second portion is from 15.24 centimeters to 17.78 centimeters.

9. The power connector of claim 6, wherein a length of the second portion is configured to extend through a housing, a motor can within the housing, and a passage between the housing and the motor can.

10. The power connector of claim 6, further comprising:
a source connector coupled to the first portion and configured to connect a power source to the power connector; and
a lead wire connector coupled to the lead wire connection feature and configured to couple a lead wire to the power connector.

11. The power connector of claim 6, wherein the conductor rod includes copper.

12. The power connector of claim 6, wherein the insulation sleeve includes nylon.

13. The power connector of claim 6, further comprising a first seal contiguous to the flange and covering a part of the first portion adjacent to the flange, the first seal including one or more ribs.

14. The power connector of claim 13, wherein
the flange includes a boss portion extending from the first flange surface in the first direction; and
the flange defines bolt holes extending therethrough along the second direction.

15. An integrated machine, comprising:
a housing including a first end and a second end;
a motor assembly proximal to the first end, the motor assembly including
a motor can located within the housing, the motor can defining a can connector hole extending radially therethrough,
a driver shaft extending through the motor can,
end windings within the motor can located adjacent to each end of the motor can and radially outward from the driver shaft,
stator laminations located between the end windings within the motor can and radially outward from the driver shaft,
a lead wire connected to the end windings, and
a power connector including
a flange including a first flange surface facing a first direction, and a housing mating surface facing a second direction, the housing mating surface being contiguous with the housing, the first direction being opposite the second direction, and a third flange surface facing the second direction, the third flange surface defining an annular slot extending into the flange from the housing mating surface toward the first direction, the third flange surface being disposed between the first flange surface and the second flange surface along the second direction;
a conductor rod formed from a conducting material, the conductor rod including
a first portion extending radially outward from the flange along the first direction, and
a second portion extending radially inward from the housing mating surface along the second direction through the housing and through the motor can, the second portion including a lead wire connection end distal to the flange, and a lead wire connection feature at the lead wire connection end,
an insulation sleeve covering the second portion from the flange to the lead wire connection end, the insulation sleeve including
a sleeve outer surface, and
a sealing rib extending outward from the sleeve outer surface, the sealing rib being disposed between the housing mating surface of the flange and the lead wire connection end of the conductor rod along the second direction, the sealing rib being radially aligned with the motor can within the can connector hole forming a seal between the insulation sleeve and the motor can, and
a lead wire connector coupled to the lead wire connection feature coupling the lead wire to the power connector, and
a first sleeve end facing the first direction and a second sleeve end disposed opposite the first sleeve end, an entirety of the insulation sleeve being disposed between the first sleeve end and the second sleeve end along the second direction, and wherein the first sleeve end bears on the third flange surface; and
a rotary machine disposed within the housing proximal the second end, the rotary machine including a machine rotor joined to the driver shaft;
a first bearing proximal to the first end supporting the driver shaft; and
a second bearing proximal to the second end supporting the machine rotor.

16. The integrated machine of claim 15, wherein a length of second portion is at least 15.24 centimeters.

17. The integrated machine of claim 15, wherein the driver shaft and the machine rotor are joined by a tierod and are bolted together.

18. The integrated machine of claim 15, wherein the first bearing and the second bearing are magnetic bearings.

19. The integrated machine of claim 15, wherein the rotary machine is a centrifugal gas compressor, the housing includes a suction port and a discharge port, and the machine rotor includes one or more centrifugal impellers; and wherein the rotary machine further includes a diffuser configured downstream of each centrifugal impeller of the one or more centrifugal impellers.

* * * * *